8430X
A. Attlis.
Chute.
Patented Oct. 4, 1834.
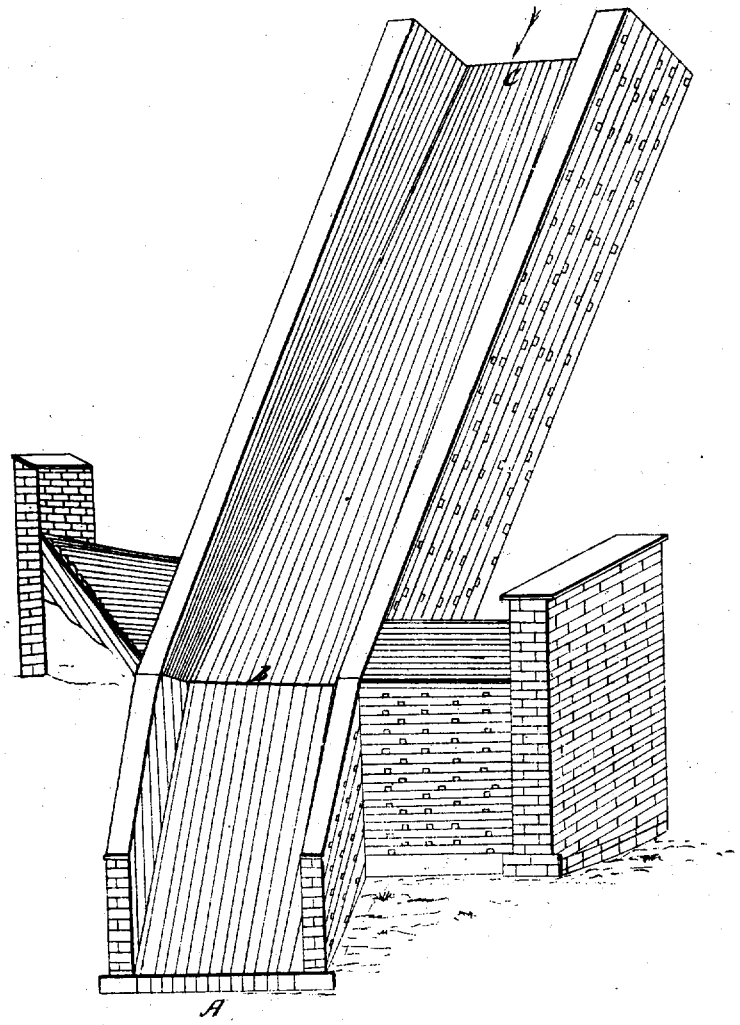

Amos Addis
Letters Patent

8430X

The Schedule referred in these Letters Patent and making part
of the same containing a description in the words of the said Amos Ad
dis himself of his improvement in the construction of Chutes or Sluices
in dams for the purpose of facilitating the descent of Arks. rafts. Boats,
and other craft with safety.

To all to whom these Presents shall come
Be it known that I Amos Addis of Washington Township in the County
of Lycoming and State of Pennsylvania have invented a new and useful improve-
ment in the construction of Chutes or Sluices in dams for the purpose of facili-
tating the descent of Arks. Rafts. Boats and other craft. with safety and that
the following is a full and exact description of the construction and operation
of the said Machine as invented or improved by me.
The entrance or mouth of the
Chute as at present constructed. being directly at the breast of the Dam. the
whole pressure of the water in the pool of the dam being concentrated to that
point, forces such a quantity of water into the Chute at the entrance
that it cannot escape or pass through with sufficient rapidity to
avoid the great pressure from behind; this rushing of the water through the
chute, occasions the great break or reaction below, and thus causes the
destruction of much property. To obviate the difficulty is the object
of the present improvement which consists in the mouth of the Chute being carried, or
extended up into the pool of the Dam, in distance of 20 to 800. feet, or ac-
cording to the height of the Dam and length of water backed in the
pool. and the bottom of the Chute at its mouth to be fair with the bed
of the River, and graduated from thence on the plan of an inclined plane
of 5 to 20 feet high. If the Dams should be 6 or 22 feet in height, all the bot
toms of the improved Chutes to be graduated in the same proportion with
wood or stone according to the height of dams or where they meet the entrance
or mouth [illegible] in the old Chutes, where the descent of the present Chute

B.J.

commences, when it gradually falls again on the same inclined plane
plan. and by extension of the Chute into the pool of the pool of the Dam
50 to 210 feet it will only require 100 feet of a Chute below the breast of
of the Dam. If the improved Chute is extended from 210 feet to any given
number of feet to 800. feet more or less, into the pool of the dam then it
will only require 50 feet of a Chute below the breast of the Dam. Then this
improved Chute can be run at all times. when the River is in raft-
ing [illegible], And by extending the summit of the inclined plane of the bottom
of the improved Chute above the breast of the Dam 50, 100 or 200. feet;
or as much more as would be proper to overcome the press of water in
the pool of the Dam; this will shorten the Chute below the breast
of the Dam to 45 feet _ this will destroy and carry of the gravel bar
which the present Chutes create, By this improvement the mouth of the
Chute is in dead shallow water, which prevents such a force and
rushing to the entrance and of course not such a break or reaction
at the discharge of the Chute into the river below the Dam, and the
water not being driven through with such force and velocity, not
moved much faster than the water in the pool of the Dam. the de-
scent is easy and safe, and not attended with such difficulty and loss
of property as is the case in running through the Common Chutes, To extend the improved Chute as far as the water is backed in the pool
of the Dam there would be but a trifling difference between the
current in the pool of the Dam and current in the Chute, By this Improvement I claim every mode of extension of the Chute
into the pools of the Dams as all extensions above the breast of the Dam
is my Improvement on the present Chute with the inclined plane
to the bottom of said Chute Witnesses
Wm Taggart
John Shaffer Amos Addis Drawing Exd. WK 770 words